Figure 1:
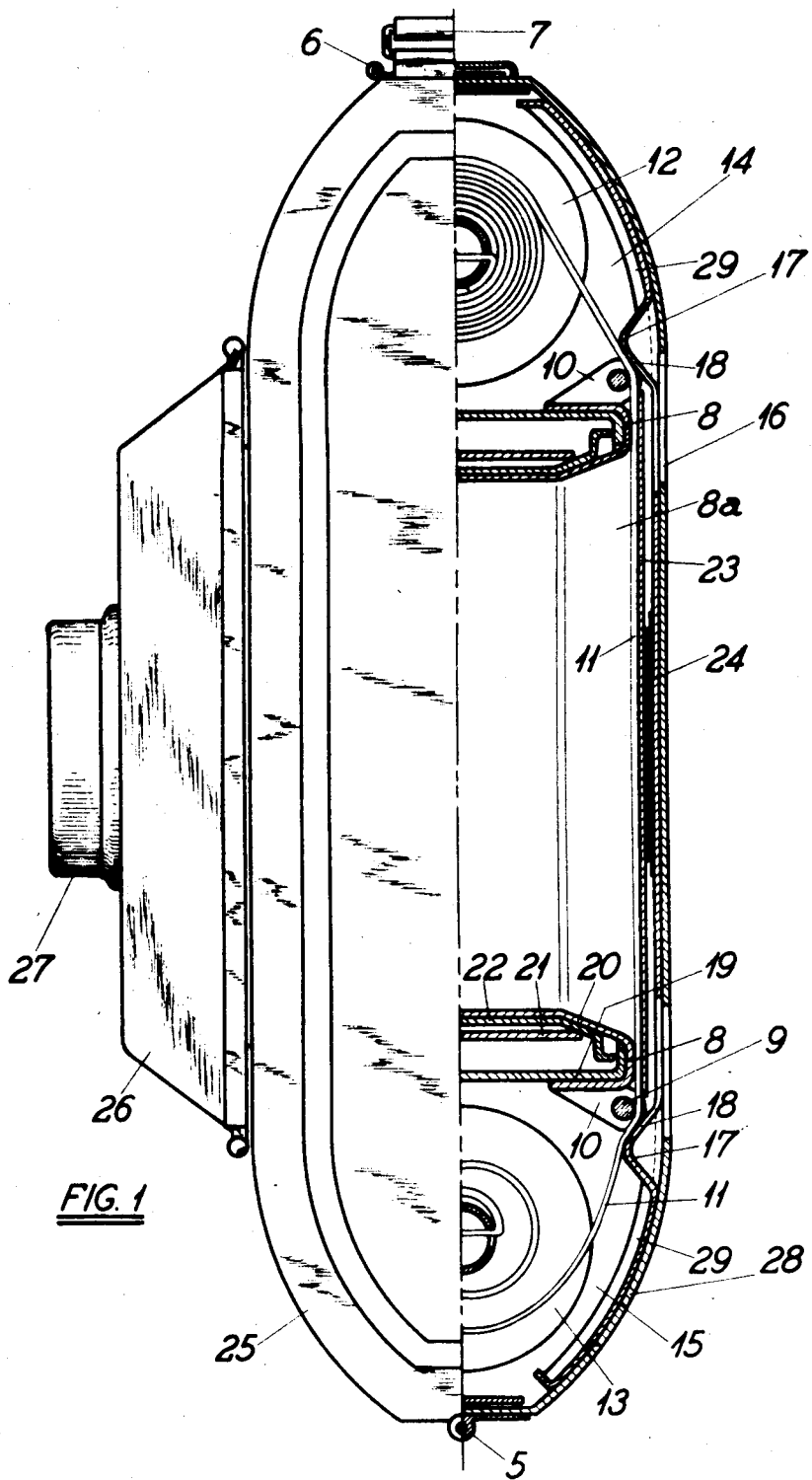

May 27, 1941.　　　E. L. FISCHER　　　2,243,460
CAMERA CONSTRUCTION
Filed April 22, 1939　　　2 Sheets-Sheet 1

INVENTOR.
EDWIN L. FISCHER
BY
*Philip S. Hopkins*
ATTORNEY.

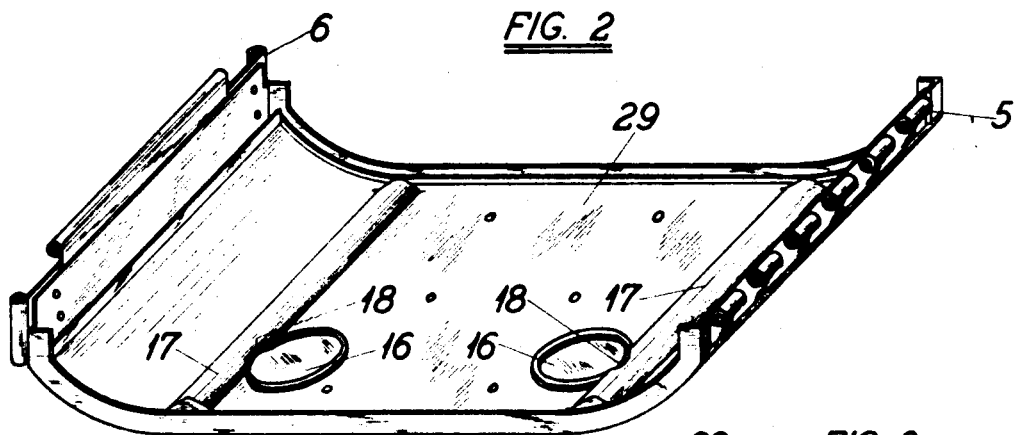
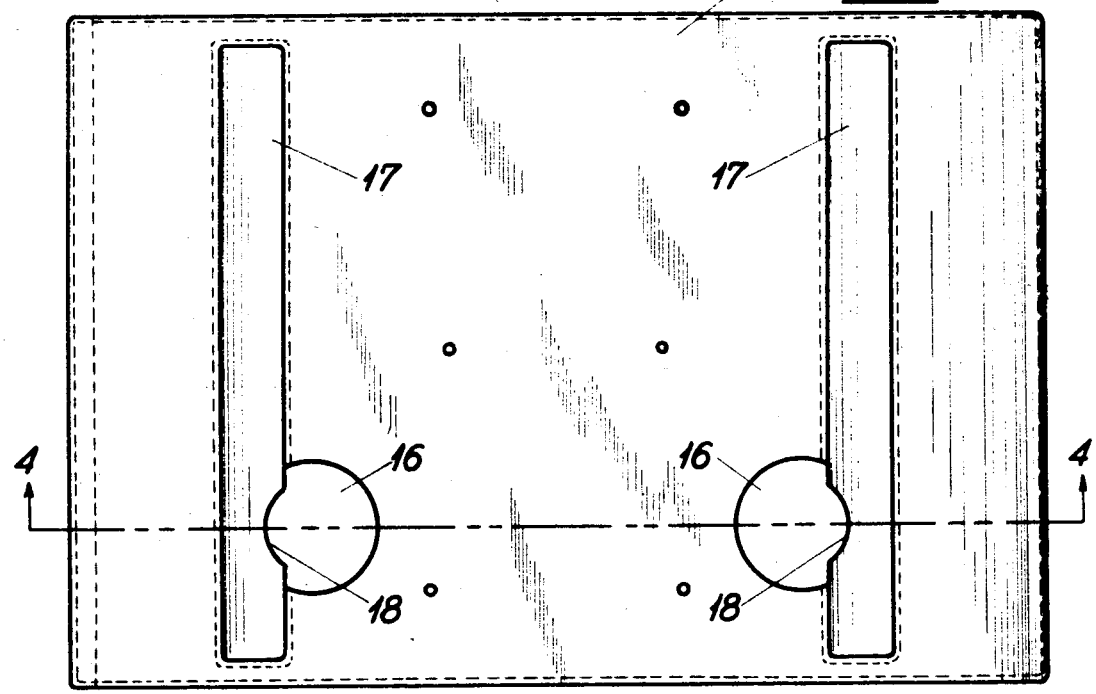
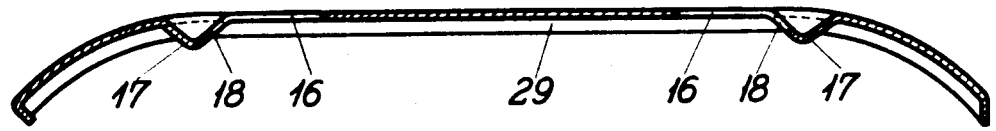

Patented May 27, 1941

2,243,460

UNITED STATES PATENT OFFICE 2,243,460

CAMERA CONSTRUCTION

Edwin L. Fischer, Endwell, N. Y., assignor, by mesne assignments, to General Aniline & Film Corporation, New York, N. Y., a corporation of Delaware Application April 22, 1939, Serial No. 269,511

2 Claims. (Cl. 95—31)

My invention relates to cameras, more particularly to a form of construction for cameras which are adapted to hold roll films.

Some of the earlier forms of camera construction supported the film unevenly in the focal plane. This was due to the fact that extra film might unwind from the spools, whereby the lack of tension permitted the film to arch away from the supporting surface slightly. This defect was especially apparent where there was any substantial spacing between the focal plane supporting surface, or exposure frame, and the back of the camera. Another disadvantage of some of the earlier forms of construction was the probability of light leakage from the film-viewing window into the film spool chambers. This light leakage was especially noticeable in the case of cameras adapted to secure double the normal number of exposures from a standard roll of film. In order to avoid the necessity of providing additional markings on the film, it has been customary to provide two film-viewing windows so spaced that the standard film marking may be aligned with first one window and then the second in making the extra exposures. It often happens that one of these film-viewing windows, instead of being wholly behind the exposure frame or supporting surface, is at the edge of such surface, perhaps overlapping the film spool chambers. In such a case it is very easy for light to leak into these chambers and fog the film.

With these disadvantages of the prior art in view, one object of my invention is to provide a novel form of camera construction. Another object is to provide a camera in which the possibility of light leakage is reduced to a minimum. A further object is to provide a camera construction in which light leakage from the film-viewing window to the film spool chambers is prevented. Still another object is to provide a camera in which the film is tensioned evenly and held against inadvertent slippage with respect to the exposure frame supporting surface in the focal plane. Other objects and advantages will be readily apparent from the following specification.

My invention accordingly comprises the general construction and arrangement, one form of which is exemplified in the accompanying drawings forming a part of this application, wherein Fig. 1 is a partial sectional view of a camera showing a construction embodying my invention; Fig. 2 is a perspective view of the camera back construction illustrating my invention, certain parts being omitted for clearness; Fig. 3 is a view of the inner shell of the camera back shown in Fig. 2; and Fig. 4 is a sectional view on the line 4—4 of Fig. 3.

In order that those skilled in the art may fully understand the nature and scope of my invention, I shall now give a detailed and concise description thereof, with particular reference to the accompanying drawings wherein like reference characters indicate like parts. In Fig. 1 the camera body 25 is provided with a suitable lens 27 mounted on a lens carrying member 26. This lens carrying member may be of the folding or telescoping form, connected to a double-walled casing member 21 and 22 adapted to slide within a double-walled shell 19 and 20 in the camera body as described and claimed in the application of Lew W. Lessler and John K. Polhemus entitled "Camera construction," Serial No. 262,714, filed March 18, 1939, which matured into Patent No. 2,208,799 on July 23, 1940. The walls 19 and 20 of the shell in the camera body may be overlappingly joined as at 8, thereby forming a focal plane supporting surface and exposure frame as is also claimed in the above application. This leaves a rectangular opening 8a through which the exposure is made on the film.

The camera is provided with a camera back or closure member 28 which may be hinged to the body portion 25 as at 5, and which is provided with the customary latching means 6 and handle 7. The camera back is preferably made with an inner shell 29 which is useful as a lining member and to insure a latch tight form of construction. The camera body is further provided with two film spool chambers 14 and 15 in which are mounted a supply spool 13 and a takeup spool 12. The film 11 passes from the spool 13 between the exposure frame and supporting surface 8 and the inner shell 29 of the camera back or closure member 28, and is finally wound on the spool 12. The supporting surface 8 may be further provided with suitable rollers 9 carried by the projections 10 on this supporting surface, as in the above-mentioned application. The camera back 28 and shell 29 are provided with the customary viewing window or windows 16 which are used to determine the position of the film 11. In the form of construction shown, these viewing windows are at the edge of the focal plane supporting surface and partially overlie the film spool chambers 14 and 15. Just outside the edges of the focal plane supporting surface the inner shell 29 of the camera back is provided with inwardly extending means 17 which are adapted to engage the film 11 directly adjacent and inwardly overlapping the ends of said supporting surface or said rollers 9. It will be readily seen from the drawings that these inwardly extending projections or ribs 17 engage the film on the spool chamber side of the rollers 9 and are adapted to tension the film evenly over the supporting surface 8.

In addition to this smoothing or "ironing" effect, the frictional engagement of the film between the rollers and the stationary projecting ribs, while insufficient to prevent easy winding of the film, will nevertheless hold the film against inadvertent slippage with respect to the exposure frame and supporting surface. In this way, even though there may be some looseness in the film spools 12 or 13 such that there is slack film between these spools and the supporting surface 8, the inwardly extending projection 17 will maintain the tension of the film 11 over the supporting surface and will confine the slack film to the chambers themselves. This tensioning action of the projections will be further aided by providing the inner shell 29 of the camera back 28 with a suitable presser plate 23 which is tensioned by spring means 24 against the film 11 in order to hold it firmly against the supporting surface 8. This presser plate is shown in Fig. 1, but is omitted from the other figures for clarity.

It will be seen from the drawings that the inwardly extending projections 17 not only tension the film evenly and prevent slippage with respect to the supporting surface, but also overlap the ends of the supporting surface in such a way as to prevent light entering through the viewing window 16 from penetrating into the film spool chambers 14 and 15. In the form of construction shown, the viewing windows extend slightly beyond the focal plane supporting surface and would normally be partially covered by the projecting means 17. Therefore I have found it desirable in this precise form of construction to partially cut away these projections as shown at 18 in order that the full area of the window will be usable in viewing the film markings.

While I have shown a form of construction which comprises an inwardly extending rib on the inner shell of the camera back cooperating with rollers 9 on the film supporting surface, it will be readily understood that any equivalent forms of construction are included within the scope of my invention. Thus, for example, the inner shell 29 may be wholly omitted and the projections formed directly on the camera back itself. Since my invention includes the broad idea of inwardly extending means adjacent the focal plane supporting surface, adapted to tension the film evenly and hold it against inadvertent slippage with respect to such surface and to exclude light from the film spool chambers, I do not wish to be limited by the precise form of construction shown, but only by the appended claims.

I claim:

1. A roll film camera having film spool chambers, a focal plane supporting surface for the light sensitive film positioned between said chambers, and a closure member provided with two film viewing windows each said window being near the edge of said focal plane surface and one of said chambers, said closure member having two inwardly extending ribs adapted to engage the film directly adjacent the edges of said supporting surface and the respective spool chambers, whereby the film is tensioned evenly and held against inadvertent slippage with respect to the supporting surface and light from the viewing windows is excluded from the film spool chambers.

2. A roll film camera having film spool chambers, a focal plane supporting surface for the light sensitive film positioned between said chambers and provided with rollers at the edges of said surface and said chambers over which the film may pass, and a closure member provided with a film viewing window and having inwardly extending ribs adapted to engage the film directly adjacent said rollers whereby the film is bent over said rollers, light from the viewing window is excluded from the film spool chambers, and the frictional coaction of said ribs and rollers tensions the film evenly and prevents inadvertent slippage with respect to said supporting surface.

EDWIN L. FISCHER.